United States Patent [19]

Facha et al.

[11] 4,331,512
[45] May 25, 1982

[54] NUCLEAR REACTOR GUARD VESSEL ARRANGEMENT

[75] Inventors: Joseph V. Facha, Reseda, Calif.; John P. Cook, Chattanooga, Tenn.

[73] Assignee: Electric Power Research Institute, Inc., Palo Alto, Calif.

[21] Appl. No.: 32,285

[22] Filed: Apr. 23, 1979

[51] Int. Cl.³ .............................................. G21C 13/00
[52] U.S. Cl. .................................................... 376/287
[58] Field of Search ....................... 176/62, 63, 65, 87, 176/38, 19

[56] References Cited

U.S. PATENT DOCUMENTS

| T911,015 | 6/1973 | Garkisch et al. | 176/87 |
|---|---|---|---|
| 3,042,599 | 7/1962 | Biehl | 176/62 |
| 3,161,570 | 12/1964 | Hammond et al. | 176/65 |
| 3,215,606 | 11/1965 | Silvester | 176/38 |
| 3,466,227 | 9/1969 | Finch | 176/87 |
| 3,775,251 | 11/1973 | Schabert | 176/38 |
| 3,926,722 | 12/1975 | Dupen | 176/87 |
| 4,071,404 | 1/1978 | Aoki | 176/87 |

FOREIGN PATENT DOCUMENTS

| 977537 | 12/1964 | United Kingdom | 176/87 |
|---|---|---|---|
| 1207120 | 9/1970 | United Kingdom | 176/87 |
| 1249331 | 10/1971 | United Kingdom | 176/65 |

*Primary Examiner*—Harvey E. Behrend
*Attorney, Agent, or Firm*—Flehr, Hohbach, Test

[57] ABSTRACT

A nuclear reactor including a vertically extending reactor vessel containing a number of reactor components and located within a cavity defined by a vertically extending, circumferential cavity wall assembly is disclosed herein. The reactor also includes a particularly designed guard vessel arrangement including a guard vessel located around and spaced from the reactor vessel between the latter and the cavity wall assembly. The guard vessel is supported by means in the shape of an inverted frustum which not only serves as a support but which also acts as a means to provide a uniform temperature gradient between the guard vessel and cavity wall assembly and provides for ready access into the space between the two vessels by suitable equipment for providing in-service inspection of the vessel walls defining this space.

10 Claims, 4 Drawing Figures

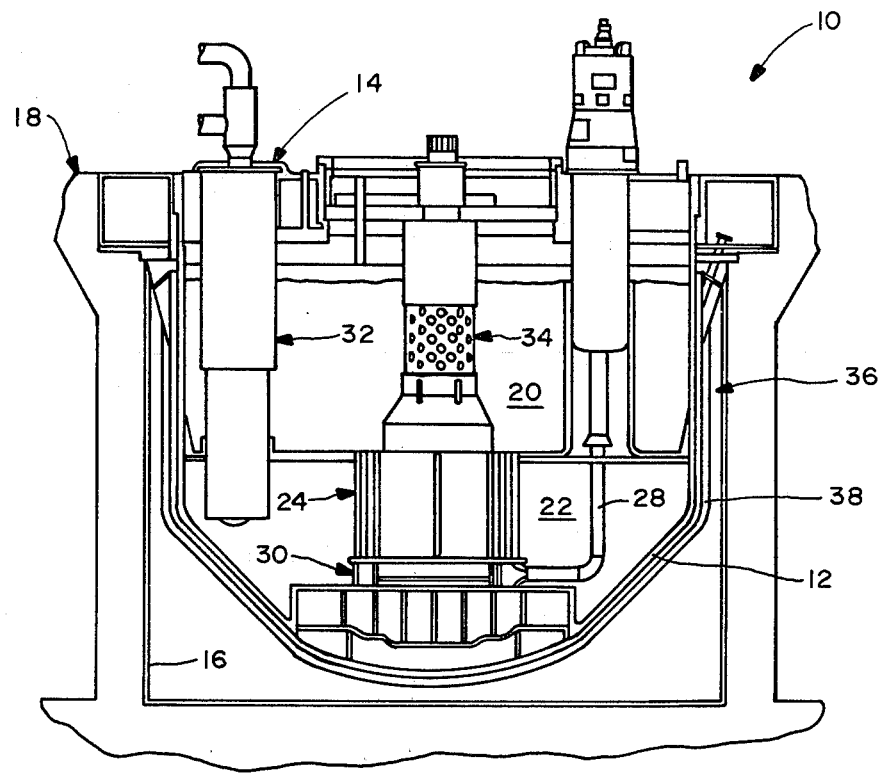
FIG.—1

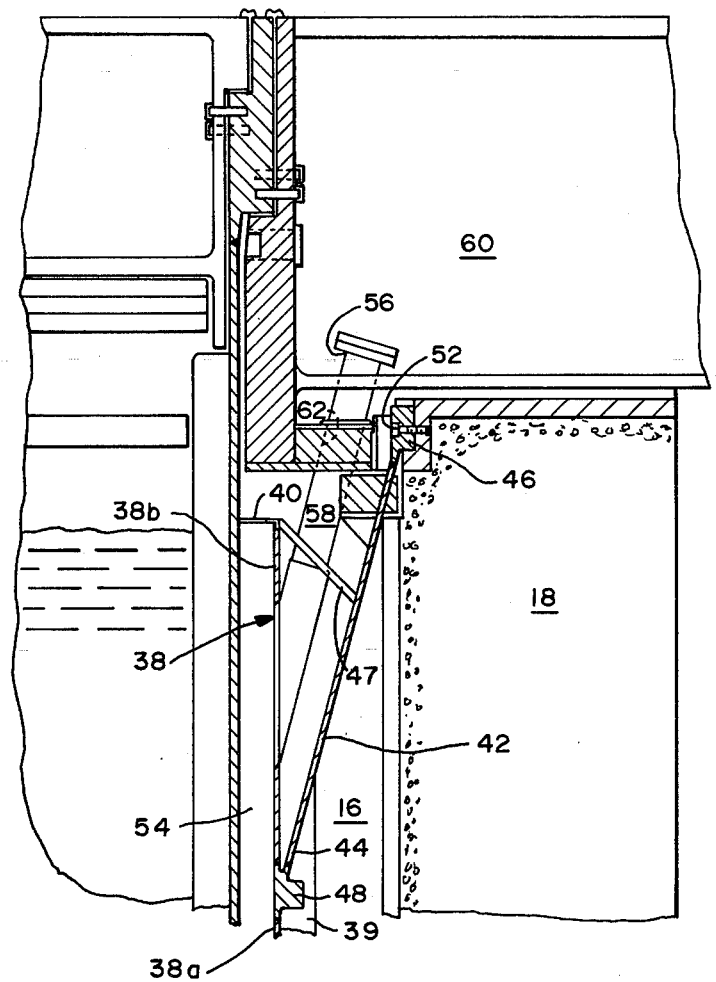
FIG.—2
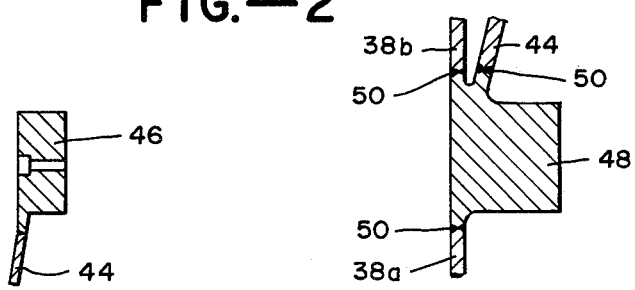
FIG.—3  FIG.—4

NUCLEAR REACTOR GUARD VESSEL ARRANGEMENT

The present invention relates generally to nuclear reactors of the type including a vertically extending reactor vessel containing a number of reactor components and located within a cavity defined by a vertically extending, circumferential cavity wall assembly, and more particularly to a guard vessel arrangement for use in such a reactor.

Nuclear reactors of the type just recited including liquid metal fast breeder reactors as an example contain liquid sodium as a coolant within their reactor vessels. As a safety measure, this type of reactor typically utilizes a guard vessel around its reactor vessel in order to confine sodium leaks resulting from defects in the latter.

The guard vessel just recited reaches relatively high temperatures during normal operation of the reactor, for example, in the range of 700°–800° F. At the same time, the cavity wall assembly remains at a relatively low temperature, for example, in the range of 110°–150° F. Nevertheless, as will be seen hereinafter, the guard vessel is supported in place by means attached directly to the cavity wall assembly and extending between this assembly and the guard vessel. Moreover, as will also be seen hereinafter, this means of support is designed to minimize thermal stress between the guard vessel and wall assembly and to allow for ready access into the space between the reactor vessel and guard vessel for suitable equipment adapted to provide in-service inspection of the vessel walls defining this space.

In view of the foregoing, one object of the present invention is to provide an improved guard vessel arrangement including a guard vessel and means for supporting the latter in a nuclear reactor of the type described.

A more particular object of the present invention is to provide a guard vessel arrangement which is designed to allow for ready access in the space between the reactor vessel and guard vessel for in-service inspection of the vessel walls on either side of this space.

Another particular object of the present invention is to provide guard vessel support means designed to provide a uniform temperature gradient between the guard vessel and the cavity wall assembly for minimizing thermal stress therebetween.

These and other objects and features of the present invention will become apparent from the detailed description to follow. As will be seen then, the guard vessel arrangement comprises part of a nuclear reactor including a vertically extending reactor vessel containing a number of reactor components and located within a cavity defined by a vertically extending circumferential cavity wall assembly, as stated above. The guard vessel arrangement itself includes a guard vessel located around and spaced from the reactor vessel and, in accordance with the present invention, means in the shape of an inverted frustum for fixedly supporting the guard vessel in place. This frustum is located within the reactor cavity between the guard vessel and wall assembly and has its top and bottom ends fixedly connected to the wall assembly and the guard vessel, respectively.

The inverted frustum shape just recited allows for ready access into the space between the reactor and guard vessels and, in a preferred embodiment of the present invention, the reactor includes means defining at least one passageway extending from a location outside and above the cavity to the space between the vessels, inside the frustum, so as to provide access therein. Moreover, in this preferred embodiment, the frustum itself is designed to provide a substantially uniform temperature gradient between the guard vessel at its bottom end and the cavity wall assembly at its top end, whereby to minimize thermal stress therebetween.

Having described the present invention and its background briefly, attention is now directed to the drawings wherein:

FIG. 1 is an elevational view, partially in section, of a nuclear reactor including a reactor vessel containing a number of reactor components and a guard vessel arrangement designed in accordance with the present invention.

FIG. 2 is an enlarged vertical sectional view of one side of the reactor of FIG. 1, particularly illustrating its guard vessel arrangement which includes a guard vessel and means in the shape of a frustum for supporting the latter.

FIG. 3 is an enlarged view in vertical elevation of the top end of the frustum support shown in FIG. 2.

FIG. 4 is an enlarged view in vertical elevation of the bottom end of the frustum support.

Turning now to the drawings, wherein like components are designated by like references numerals throughout the various figures, a nuclear reactor generally indicated by the reference numeral 10 is illustrated in FIG. 1. In a preferred embodiment, this reactor is a liquid metal fast breeder reactor but may be of any other type compatible with the present invention to be described hereinafter. The reactor shown in FIG. 1 includes a reactor vessel 12 which extends vertically downward from a location circumferentially just beyond a reactor cover or deck assembly 14 within a cavity 16 defined by a vertically extending, circumferential cavity wall assembly 18. The reactor vessel may be supported in this position and designed conventionally or in accordance with co-pending U.S. patent application Ser. No. 32,283, filed Apr. 23, 1979 and entitled "Nuclear Reactor Including a Reactor Vessel and Technique for Supporting the Latter", this application having been assigned to Assignee of the present application. As shown in FIG. 1, the reactor vessel contains a number of reactor components within a pool of hot sodium generally indicated at 20 and/or within a pool of cold sodium generally indicated at 22. These reactor components include a central core 24 containing both fuel and blanket assemblies (not shown) and an arrangement for cooling these assemblies by passing sodium from the cool pool through the core, across the assemblies and thereafter into the hot pool. In order to accomplish this a pump 26 is utilized along with discharge piping 28 and a plenum 30 for receiving the sodium from the discharge piping and passing it into the fuel and blanket assemblies within the core. The plenum may be constructed conventionally or in accordance with co-pending U.S. patent application Ser. No. 32,361, filed Apr. 23, 1979, and entitled "Flow Distribution System for Coolant in a Nuclear Reactor and Method", this application having been assigned to Assignee of the present application.

Other reactor components include an internal heat exchanger 32 adapted to receive the coolant from the hot pool after the latter passes through the fuel and blanket assemblies, an instrument tree 34 mounted over the core and other components which may or may not be illustrated but which are not pertinent to the present invention. All of these reactor components including the ones recited above may be readily provided by those with ordinary skill in the art and/or in accordance with the above recited co-pending applications and hence, will not be discussed in detail herein except where necessary for a better understanding of the present invention. For the moment it should suffice to say that during normal operation of the reactor, its vessel 12 containing the various components described reaches relatively high temperatures, for example, those in the range of about 700° to 800° F.

In addition to the various components thus far described, reactor 10 includes a guard vessel arrangement 36 designed in accordance with the present invention. As seen in FIG. 1, this arrangement includes a guard vessel 38 located around and spaced from reactor vessel 12 between the latter and cavity wall assembly 18 within cavity 16. This guard vessel which is preferably covered on its exterior surface with a layer of thermal insulation 39 (FIG. 2) serves as a protective barrier against sodium leakage through the primary vessel, that is, reactor vessel 12 in the event of cracks or other such damage to the latter. The guard vessel may be constructed of any suitable material compatible with the present invention and the reactor environment but is preferably constructed of carbon steel, specifically SA-516, grade 70, carbon steel with a maximum carbon content of 0.24% complying with the requirement of ASME code case 1714 in a specific embodiment.

Referring specifically to FIG. 2, it can be seen that the top end of guard vessel 38 indicated generally at 40 terminates just under the inner peripheral edge of the top of the cavity wall assembly 18. As also seen in this figure, arrangement 36 includes a support skirt 42 in the shape of an inverted frustum for fixedly supporting the guard vessel in place. This inverted frustum is located within cavity 16 between the guard vessel and cavity wall assembly and includes a bottom end 44 and a diametrically larger top end 46. Bottom end 44 extends entirely around and is welded or otherwise fixedly connected to the guard vessel a predetermined distance from top end 40, as best seen in FIG. 2. As best seen in FIG. 4, bottom end 44 joins guard vessel 38 by means of an enlarged circumferential rib 48 which serves to connect bottom end 44 with the lower portion of the guard vessel, generally indicated at 38a and with its top portion generally indicated at 38b. While this may be accomplished in any suitable way, weld joints 50 shown in FIG. 4 are utilized to this end.

Returning to FIG. 2, it can be seen that the vessel support 42 tapers upwardly and outwardly from its bottom end to its top end 46 which forms a circumferential flange best seen in FIG. 3. This flange is adapted to receive a plurality of circumferentially spaced bolts 52 (FIG. 2) for fastening the top end of the frustum to the top inside corner of cavity wall assembly 18. The bolts 52 are aligned with their longitudinal axes directed toward the center of the reactor 10 and lying in a horizontal plane so as not to restrain diffential thermal expansion between the flange 46 and cavity wall assembly 18.

As stated previously, reactor vessel 12 will reach relatively high temperatures, e.g., in the range of 700° F. to 800° F. during normal operation of the reactor and hence so will guard vessel 38. At the same time, the cavity wall assembly 18 remains at a substantially lower temperature, e.g., in the range of 110° F. to 150° F., as stated previously. Therefore, since frustum 42 is connected at one end to the relatively high temperature guard vessel and at its other end to the relatively low temperature wall assembly, it is important to minimize if not eliminate the presence of thermal stress which might otherwise result from this interconnection. This is accomplished in accordance with the present invention by selecting a frustum to provide a substantially uniform temperature gradient between the guard vessel at its bottom end and the wall assembly at its top end. In other words, the frustum must be properly dimensioned and of the proper material such that its lower end 44 is at the temperature of the guard vessel, for example 750° F., such that its top end is at the temperature of the cavity wall assembly, for example 150° F., and such that there is a uniform change in temperature therebetween. On with ordinary skill in the art could readily provide the proper frustum design to meet this criteria. Obviously, one factor in this design is the overall distance between the bottom "hot" end and the "cold" end. By using a frustum shape, this length is maximized considering its surrounding environment and, of course, by maximizing this distance the possibility of thermal stress is minimized. The actual material making up frustum 42 must, of course, be compatible with its use as a temperature gradient as well as its use as a support. In a preferred embodiment, the frustum is constructed of carbon steel and is identical in material to the guard vessel in a specific embodiment.

From the foregoing, it should be apparent that frustum 42 not only acts as a support for guard vessel 42 but also as means for providing a temperature gradient for minimizing thermal stress between the guard vessel and the cavity wall assembly. However, because of its particular shape this support allows for direct access into the space between the reactor vessel and guard vessel, generally indicated at 54. In order to provide this access, reactor 10 includes at least one but preferably a number of tubular port assemblies 56, each of which defines a passageway 58 extending from a location outside and above cavity 16 to space 54 between the reactor vessel and guard vessel, inside frustum 42. While only one port 56 is shown in FIG. 2, the remaining ports would be circumferentially spaced around the guard vessel just inside frustum 42. As seen in FIG. 2, the top end of the port (as well as all the other ports) is located between the upper and lower flanges of a radial beam 60 comprising part of assembly 18. This port extends downward through a cooperating opening 62, and thereafter between adjacent support struts 47, terminating at the outer surface of upper section 38b of guard vessel 38 encompassing a cooperating passageway.

As stated above, each passageway 58 defined by a port 56 provides direct access to space 54 from a location above cavity wall assembly 18. Each of these ports is suitably sized to gain direct access therein and therethrough by suitable equipment for providing in-service inspection of the outer surface of reactor vessel 12 and the inner surface of guard vessel 38. In most cases the reactor vessel is constructed of stainless steel and, hence, can be inspected visually. Hence, a camera can be moved into and through the ports for passage into space 54 for visual inspection of the reactor vessel. This is accomplished by moving the camera down and against the inner surface of the guard vessel when inspecting the reactor vessel. Similar equipment can be moved down and against the reactor vessel when inspecting the guard vessel. The top section 38b of the guard vessel serves as a support for inspecting the top section of the reactor vessel.

What is claimed is:

1. In a nuclear reactor including a vertically extending reactor vessel containing a number of reactor components and located within a cavity defined by the vertically extending, circumferential cavity wall assembly, the improvement comprising a guard vessel arrangement including a guard vessel located around and spaced from said reactor vessel between the latter and said cavity wall assembly and means in the shape of an inverted frustum having a circumferential bottom end, a larger circumferential top end and an upwardly and outwardly extending, substantially solid main body disposed between and connected with said circumferential ends, said frustum being located within and extending entirely around said cavity between said guard vessel and said cavity wall assembly and having said top and bottom ends fixedly connected to said wall assembly and guard vessel, respectively for fixedly supporting the latter in place.

2. The improvement according to claim 1 including means defining at least one passageway extending from a location outside and above said cavity to the space between said reactor vessel and guard vessel inside said frustum, each of said passageway defining means providing a direct access into said space for suitable equipment for providing in-service inspection of the outer surface of the reactor vessel and the inner surface of the guard vessel.

3. The improvement according to claim 2 wherein said guard vessel includes a circumferential section which extends vertically up beyond the bottom end of said frustum for supporting said in-service inspection equipment and wherein said passageway extends through said extension.

4. The improvement according to claim 1 wherein said guard vessel reaches relatively high temperatures within an upper predetermined range during normal operation of the reactor and wherein said cavity wall assembly remains at substantially lower temperatures within a lower predetermined range, said frustum being designed to provide a substantially uniform temperature gradient between the bottom end of the frustum and the wall assembly at the top end of the frustum, whereby to minimize thermal stress therebetween.

5. The improvement according to claim 4 wherein said upper predetermined range is about 700°–800° F. and wherein said lower predetermined range is about 110°–150° F.

6. The improvement according to claim 4 wherein said frustum is constructed of carbon steel.

7. In a nuclear reactor including a vertically extending reactor vessel containing a number of reactor components and located within a cavity defined by a vertically extending, circumferential cavity wall assembly which is maintained at a temperature between about 110°–150° F., the improvement comprising a guard vessel arrangement including a guard vessel located around and spaced from said reactor vessel between the latter and said cavity wall within said cavity, said guard vessel reaching temperatures within a range of about 700°–800° F. during normal operation of the reactor, means in the shape of an inverted frustum constructed of carbon steel and having a circumferential bottom end, a larger circumferential top end and an upwardly and outwardly extending, substantially solid main body disposed between and connected with said circumferential ends, said frustum being located within and extending entirely around said cavity between said guard vessel and said cavity wall assembly and having said top end fixedly connected to said wall assembly and a bottom end fixedly connected to said guard vessel a predetermined distance below and inwardly of the top end of the latter for fixedly supporting the guard vessel in place, said frustum being designed to provide a substantially uniform temperature gradient between the guard vessel at its bottom end and the wall assembly at its top end whereby to minimize stress therebetween, and means defining a plurality of passageways extending from locations outside and above said cavity to the space between said reactor vessel and guard vessel inside said frustum, whereby to gain direct access into said space by suitable equipment for providing in-service inspection of the outer surface of the reactor vessel and the inner surface of the guard vessel.

8. The improvement according to claim 7 wherein said guard vessel includes a circumferential section which extends vertically up beyond the bottom end of said frustum for supporting said in-service inspection equipment and wherein said passageway extends through said extension.

9. The improvement according to claim 8 including bottom and top circumferential flange means thicker in cross-section than said frustum for respectively connecting the bottom and top ends of the frustum to said guard vessel and said cavity wall assembly.

10. The improvement according to claim 9 wherein said top flange means includes a plurality of circumferentially spaced bolt means disposed within a common plane for connecting the top end of said frustum with said cavity wall assembly.

* * * * *